United States Patent [19]

Hogg

[11] E Re. 28,558

[45] Reissued Sept. 23, 1975

[54] SELF-CLEANING APERTURE TUBE FOR COULTER STUDY APPARATUS

[75] Inventor: Walter R. Hogg, Miami Lakes, Fla.

[73] Assignee: Coulter Electronics, Inc., Hialeah, Fla.

[22] Filed: June 10, 1974

[21] Appl. No.: 477,760

Related U.S. Patent Documents

Reissue of:

[64] Patent No.: 3,746,976
Issued: July 17, 1973
Appl. No.: 131,923
Filed: Apr. 7, 1971

[52] U.S. Cl. ..... 324/71 CP
[51] Int. Cl.[2] ..... G01N 27/00
[58] Field of Search ..... 324/71 CP

[56] References Cited

UNITED STATES PATENTS 3,299,354 1/1967 Hogg ..... 324/71 CP
3,583,209 6/1971 Banks ..... 73/432 PS

*Primary Examiner*—Robert J. Corcoran
*Assistant Examiner*—Rolf Hille
*Attorney, Agent, or Firm*—Silverman & Cass, Ltd.

[57] ABSTRACT

A two chamber aperture tube for obtaining signals from particles suspended in a fluid which passes through a scanning aperture. The suspension enters the primary bore provided in one chamber and passes immediately to an inlet port or orifice in an elongate nozzle provided in the second chamber. The chambers are interconnected by conduits including a pump and filter such that flow of the suspension is continuous about a closed path to ensure that proper signals from all particles in the suspension are obtained.

14 Claims, 3 Drawing Figures

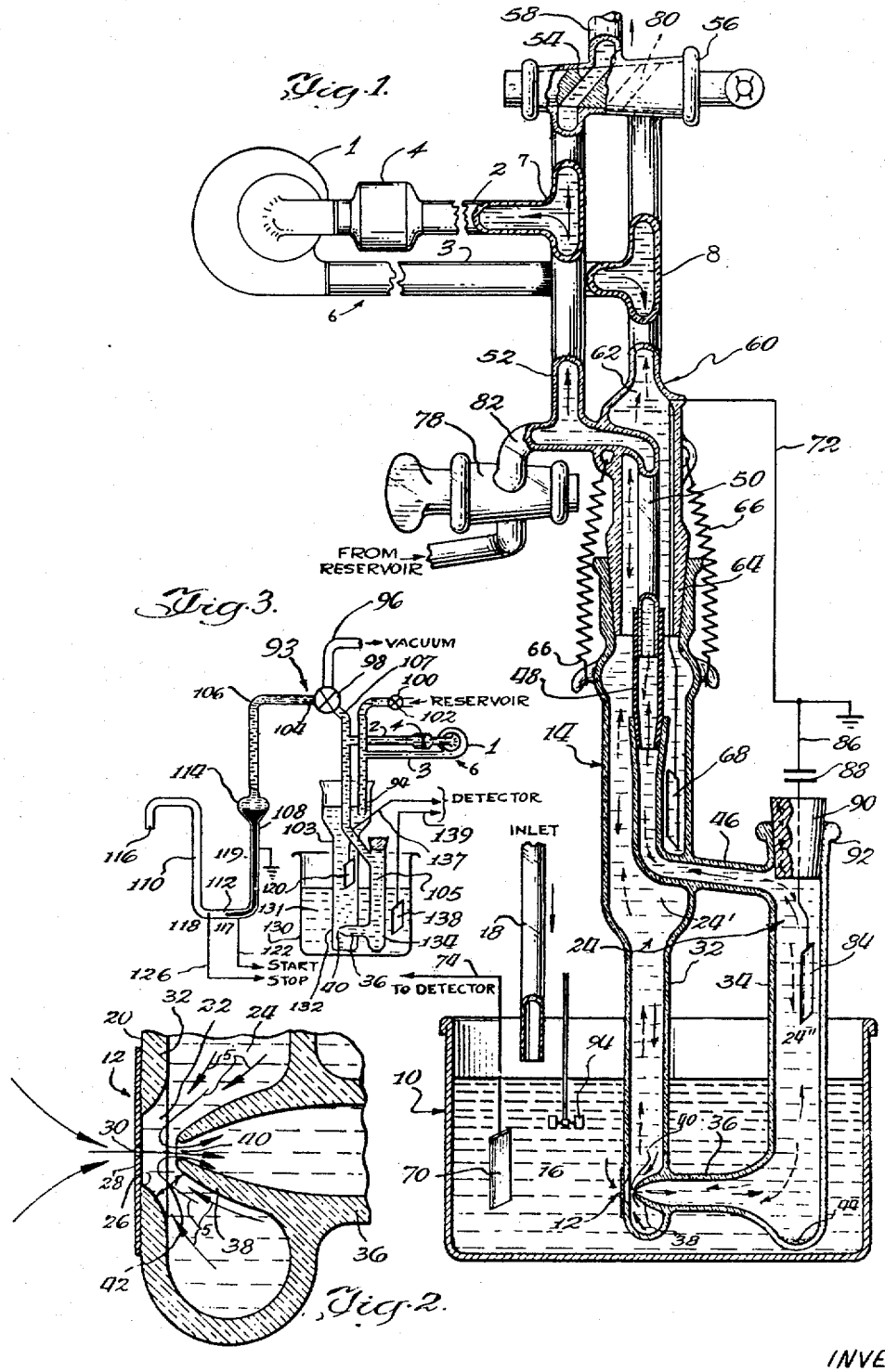
INVENTOR:
WALTER R. HOGG
By: Silverman & Cass
ATTORNEYS

SELF-CLEANING APERTURE TUBE FOR COULTER STUDY APPARATUS

Matter enclosed in heavy brackets [ ] appears in the original patent but forms no part of this reissue specification; matter printed in italics indicates the additions made by reissue.

CROSS-REFERENCE TO RELATED PATENT

The structure to which this invention applies is of the type described and disclosed in U.S. Pat. No. 3,299,354 (herein called "the Related Patent") issued Jan. 17, 1967 for "Aperture Tube Structure for Particle Study Apparatus" to the same inventor, and owned by the same assignee, as the invention herein. The said Related Patent is incorporated herein as part hereof by specific reference.

BACKGROUND OF THE INVENTION

1. Field of the Invention

This invention relates generally to the art of studying the physical properties of particles carried in suspension and more particularly is concerned with improved apparatus for obtaining signals from particles passing through a scanning aperture without extraneous interference from other particles.

2. Description of the Prior Art

The structure disclosed in the Related Patent substantially decreases the possibility of undesirable spurious particle reading and count signals which occurred in prior art devices. This is accomplished by replacing the so-called aperture tube of prior art structures with a pair of chambers having an interconnection for separating the electrical and mechanical effects of the particles passing through the aperture. Particles passing through the aperture of the apparatus immediately are transported away from the proximity of the aperture so that there is little or no change of spurious signals resulting from said particles.

One of the objects of the invention disclosed in the Related Patent was to provide an aperture tube which is self-cleaning in that the suspension in the immediate vicinity of the aperture is kept free of extraneous particles. As acknowledged in the patent, however, eddy currents of fluid in the aperture tube at the downstream end of the primary bore occurred, and these eddy currents swirled into the secondary bore immediately adjacent the primary bore. It was believed that the fluid would be stagnant liquid substantially devoid of particles, hence not introducing appreciable extraneous signals, but while this was largely true, the action was not sufficiently perfect to satisfy the more critical demands of today's technology. A small percentage of particles were not caught by the orifice in the elongate neck of the second chamber and these sometimes produced extraneous signals by virtue of the eddy currents at the bottom of the central chamber of the aperture tube.

SUMMARY OF THE INVENTION

To resolve the aforesaid problems with regard to extraneous signals, the present invention provides a self-cleaning aperture tube as disclosed in the related patent, with the addition of a pump device interposed between the first and second chambers to produce a closed system in which there are no inlets or outlets other than the primary bore in the first chamber. The pump operates to draw the particle suspension up through the second chamber and force the same back into the first chamber, completing a circuit around this path and creating a sheath flow at the orifice. The flow created by the pump is such as to ensure that all particles introduced into the aperture tube are caught by the orifice of the second chamber so as to prevent the occurrence of extraneous signals.

Accordingly, the primary object of the invention is to provide an improved structure which ensures that all particles passing through the primary bore are caught by the orifice provided in the second chamber of the aperture tube.

Other objects and advantages of the invention will occur to those skilled in this art as a description of the invention proceeds in connection with which a preferred embodiment is illustrated in the accompanying drawings and set forth in the accompanying specification.

BRIEF DESCRIPTION OF THE DRAWING

The drawing is identical to that of the Related Patent, except for those elements added thereto in accordance with the invention herein.

FIG. 1 is a sectional view through the apparatus of the Related Patent, with the pump device and related elements of the invention illustrated in diagrammatic form.

FIG. 2 is a fragmentary enlarged sectional view through the apparatus in the vicinity of the aperture.

FIG. 3 is a diagrammatic view of a device operating in connection with the manometer-syphon having the improved invention associated therewith.

DESCRIPTION OF THE PREFERRED EMBODIMENT

In the following description, elements which are identical to those disclosed in the related patent are referred to herein by the same names and are indicated by the same reference numerals. Since the related patent is incorporated herein as a part hereof by specific reference, the disclosure thereof will not be repeated except in instances where understanding of the invention herein will be enhanced.

As illustrated in FIG. 1, a multiple chamber aperture tube or vessel 14 comprising a first or central chamber 32 and a second chamber 34 is suspended within a vessel 10. In operation, the suspension 16 in vessel 10 will flow through the aperture 12 and will, ideally, shoot directly into the orifice 40 and into the neck 36, to be carried thereafter along through chamber 34, conduit 46, coupling 48, outlet conduit 50 and up branch 52. In the structure of the Related Patent, the suspension would then continue to discharge conduit 58 by way of passage 54 of stop-cock 56.

In order to ensure that all particles in suspension 16 are caught by orifice 40 as they flow through aperture 12, the apparatus of the invention includes a pump and associated elements designated generally by the reference numeral 6, which elements have been interposed between the two chambers 32, 34. In the embodiment illustrated, a pair of T junctions 7, 8 have been spliced into branch 52 and conduit 62, respectively, so as to introduce the elements 6 into the flow system represented by the solid line arrows throughout the aperture tube 14. A conduit 2 leads through a filter 4 into pump 1 from junction 7, and conduit 3 leads out of pump 1 into junction 8.

It is to be understood that the points of entry 7, 8 into the two chambers 32, 34 could be made at any point along the lengths thereof. The particular location shown is for illustrative purposes only.

The addition of the elements 6 to the system of the related patent produces a closed system within the aperture tube 14 whereby, upon operation of pump 1, suspension 16 is sucked through neck 36, up chamber 34, and through conduits 46, 50 and 2. The suspension then passes through filter 4, where the particles suspended therein are removed, and into pump 1. The particle free suspending liquid 16 is then forced back into chamber 32 by way of conduits 3 and 62, completing a circuit around this path and creating a sheath flow at orifice 40. The sample flow as described in the related patent will be unaffected since this closed system has no other inlets or outlets.

Operation of pump 1 ensures that all particles in suspension 16 are caught by the orifice 40 as they pass through aperture 12. The added flow of clean suspension fluid, indicated by arrows 5 in FIG. 2, serves further to sweep the region of secondary bore 22 free of all particles which are extraneous to those on which the sensing operation is performed. By adjustment of the pump pressure, the sheath flow 5 will be of proper strength to ensure that all particles pass directly into orifice 40.

The operation and functions of all remaining elements illustrated in the drawing are the same as described in the related patent.

I claim:

1. In a particle measuring apparatus including a container of particulate liquid suspension to be tested, an aperture tube extending into said container, a vacuum source for moving the liquid from the container into and through the aperture tube, a first electrode in the container and a second electrode in the aperture tube to establish an electrical field between said container and the aperture tube, and a detector, the aperture tube having a first and a second chamber, the first chamber having an aperture in communication with the liquid suspension in the container, said second chamber having an orifice provided therein at a point closely spaced from and directly opposite the interior of said aperture, means connecting said second chamber to said vacuum source and means to initially fill the first chamber with particle free liquid and the second chamber with the liquid suspension, the improvement comprising, a conduit extending between said chambers to provide a closed path for liquid flow therebetween, a pump interposed in said conduit to create liquid flow about said path, and a filter member in said conduit, whereby the suspension will flow from the container through the aperture and the orifice into said second chamber to mix with the liquid already therein and circulate about said path, said filter member removing the particles from the liquid before the same is returned to the first chamber.

2. The structure as claimed in claim 1 in which an elongate neck extends from the second chamber into the first chamber and said orifice is provided in said neck.

3. An aperture tube for use in particle measuring apparatus including a container of particulate liquid suspension into which the aperture tube extends, said tube including a first and a second chamber, the first chamber having an aperture in communication with the liquid suspension, said second chamber having an orifice provided therein at a location directly opposite the interior of said aperture, means for connecting said second chamber to an external source of vacuum, conduit means extending between said chambers to provide a closed path for liquid flow therebetween, a pump interposed in said conduit means to create liquid flow about said path, and a filter member in said conduit means, whereby the suspension will flow through said aperture in the first chamber and through said orifice in the second chamber and then through said conduit and said pump and said filter member where the particles from the suspension are removed before the same is forced into the first chamber and returned through said orifice.

4. An aperture tube as claimed in claim 3 in which an elongate neck extends from said second chamber into said first chamber and said orifice is provided in said neck.

5. In a particle measuring apparatus which responds to the changes of electrical impedance due to the displacement of electrolyte by particles suspended therein in an aperture which constricts an electric field, including a container of liquid suspension to be tested, a dual-chamber aperture tube having a first and a second chamber extending into said container, a vacuum source for moving the liquid from the container into and through the aperture tube, a first electrode in the container and a second electrode in the aperture tube to establish the electric field, and a detector, the first chamber having an aperture forming a communication between said container and said first chamber, the second chamber having an orifice forming a communication between said first and said second chambers, said orifice being positioned close to and directly opposite said aperture, the improvement comprising, means for preventing particles from the contents of the container from being transferred to suspension in the contents of the first chamber.

6. The structure as claimed in claim 5 in which said means comprises a conduit extending between said chambers to provide a closed path for liquid flow therebetween, a pump interposed in said conduit to create liquid circulation about said path, and a filter for removing particles from the circulating liquid, such that the volume of liquid which flows into said orifice is the sum of the circulation about said closed path plus the flow from said container into said first chamber.

7. The structure as claimed in claim 6 in which said vacuum source is adapted to withdraw liquid from the low pressure side of said pump.

8. The structure as claimed in claim 7 in which an elongate neck extends from the second chamber into the first chamber and said orifice is provided in said neck.

9. The structure as claimed in claim 7 in which filling means are provided to fill the aperture tube, said conduit and said pump with liquid prior to performing the first test of particle suspension contained in said container.

10. The structure as claimed in claim 9 in which said filling means comprise a two-way stopcock and an open-close stopcock, said two-way stopcock being adapted to apply vacuum either to said first or said second chamber or to neither, said open-close stopcock being adapted to connect one chamber to a reservoir of suspension liquid.

11. The structure as claimed in claim 10 in which an elongate neck extends from the second chamber into the first chamber and said orifice is provided in said neck.

*12. In a particle measuring apparatus including a vessel for containing a body of particulate liquid suspension to be tested, an aperture tube extending into said vessel and including an aperture, fluid moving means for establishing pressure differentials and adapted for moving the suspension from the vessel through the aperture into and through the aperture tube to a waste collection container, a first electrode in the vessel and a second electrode in the aperture tube to establish an electrical field in the aperture between said vessel and the aperture tube, means including electrical leads connected to the electrodes and adapted to extend connections to a detector to respond to electrical measuring signals produced across said electrodes with passage of particles through said aperture, the aperture tube having an inlet chamber adapted for fluid connection with a source of particle free liquid, said inlet chamber having said aperture in fluid communication on one side thereof with the suspension in the vessel to permit passage of the suspension through the aperture into the inlet chamber, there being a zone in the aperture tube proximate to and downstream of the aperture in which spurious signals may normally be produced, an outlet chamber in fluid connection with said inlet chamber, means for connecting said outlet chamber to said fluid moving means and said waste collection container, means for initially filling the inlet and outlet chambers with particle free liquid; the improvement comprising, said aperture tube having a restriction in the path of flow of said particle free liquid to cause the flow velocity thereof to increase in the spurious signal producing zone and continuously to wash the zone simultaneously with passage of the suspension through the aperture such that particles which have been measured within the aperture while the apparatus is in use for measuring particles and the means for initially filling the inlet and outlet chambers are rendered inoperative and thereafter passing out of the same immediately are swept out of the spurious signal producing zone by the particle free liquid and moved into the outlet chamber.*

*13. The invention as claimed in claim 12 in which said fluid moving means comprise a source of vacuum.*

*14. An aperture tube for use in particle measuring apparatus including a container of particulate liquid suspension into which the aperture tube extends, said tube comprising, an inlet chamber, an outlet chamber in fluid connection with the inlet chamber, the inlet chamber having an aperture adapted to be in communication on one side thereof with the liquid suspension, there being a zone in the aperture tube proximate to and downstream of the aperture in which spurious signals may normally be produced, means for connecting the inlet chamber to a source of particle free liquid, means for directing flow of said particle free liquid from said source into and through said inlet chamber and thereafter into and through said outlet chamber, means for connecting the outlet chamber to fluid moving means to move the suspension from the container through the aperture into the spurious signal producing zone while said particle free fluid is so flowing, the tube having a restriction in the path of flow of the particle free liquid to cause the flow velocity thereof to increase in the spurious signal producing zone and continuously wash the zone simultaneously with passage of the suspension through the aperture such that particles which have passed through the aperture immediately are swept out of the spurious signal producing zone by the particle free liquid and moved into the outlet chamber.*

* * * * *